Patented May 16, 1950

2,508,215

UNITED STATES PATENT OFFICE 2,508,215

PROCESS OF REMOVING PROTECTIVE COATING FILMS FROM SURFACES

Richard B. Bishop, Haddonfield, and William I. Denton, Woodbury, N. J., assignors to Socony-Vacuum Oil Company, Incorporated, a corporation of New York No Drawing. Application April 29, 1947, Serial No. 744,800

3 Claims. (Cl. 252—152)

This invention relates to improved compositions used for the removal of protective coatings produced with paint, varnish, stain, enamel, shellac, lacquer, or the like.

Of the various finish removers presently employed, those most generally used consist of a mixture of a low molecular weight aliphatic alcohol, an aromatic hydrocarbon, and an aliphatic aldehyde or ketone. These compositions have in some instances been modified, depending in part upon the nature of the protective coating to be removed, by addition of various materials such as aliphatic amines, nitro-paraffins, halogen-containing compounds, and small amounts of cellulose esters or paraffin waxes. The finish remover is usually applied by spraying or by means of a brush and allowed to penetrate into the dry protective coating film until sufficient softening occurs to permit removal of the film by scraping, rubbing, or similar means. The principal objection to these conventional paint and other finish removers is that the predominant paint loosening constituents, that is, the aromatics, ketones, etc., are volatile, inflammable compounds. Often the thin film of remover applied evaporates so rapidly that it does not have time to penetrate the protective coating. This, in turn, generally necessitates several applications of the remover to dissolve or loosen the paint, varnish, or other coating being removed. Repeated applications of the remover is also needed, due to the high volatility of the composition, since the coating, which is dissolved, dries or hardens before it can be removed. For this reason, generally only a relatively small area can be treated at one time to permit the loosened protective coating film to be removed before it again dries and hardens.

It is an object of this invention to overcome the aforementioned disadvantages of the finish removers employed heretofore. It is a further object to provide a composition useful for the removal of protective coatings which has a substantially low volatility and low inflammability. A still further object is the provision of a general finish remover which is adapted for removing all of the common protective coating films. A very important object is to provide an efficient remover which will readily penetrate the protective coating film and maintain the dissolved or loosened film of coating in a moist condition for a period of time sufficient to permit its removal from the coated surface. Another important object is the provision of a composition capable of removing the protective coating from a variety of surfaces of the nature of wood, metal, stone, etc., without corroding or damaging said surface.

These and other objects which will be recognized by those skilled in the art are attained in accordance with the present invention by the provision of a composition having, as one of its principal film removing constituents, an aromatic nitrile. Thus, in accordance with the invention described herein, aromatic nitriles characterized by low volatility and inflammability have been found to be effective, general finish removers for painted, varnished, stained, lacquered and enameled surfaces. The nitriles may be employed either alone or may be combined with any of the conventionally employed organic compounds set forth above or other materials which may either aid in dissolving or loosening the protective coating film or may serve as extenders or diluents of the organic nitrile constituent. When the nitrile is combined with other compounds, it is suitably present in the resulting mixture as the major film removing component. Thus, in its more preferable aspects, the present invention contemplates a paint or other finish removing composition consisting of an aromatic nitrile or containing an aromatic nitrile as the major film removing component. Under some conditions, it may be found desirable to employ the aromatic nitrile in the form of an emulsion, such as an aqueous emulsion or dispersion.

The present invention contemplates the use of any of the common aromatic nitriles in the removal of protective coatings. Representative of the nitriles which may be employed in the finish removing compositions of the present invention are benzonitrile, tolunitriles, phthalnitriles and the like. Particular preference is accorded benzonitrile and tolunitriles, since compositions consisting essentially of these compounds were found to be most effective from the standpoint of rapidity and thoroughness in removing finishes from painted, varnished, stained, enameled and lacquered surfaces.

To establish the effectiveness of aromatic nitriles as protective coating removing compositions, the following test was applied: A panel was coated with the finish to be removed. The coated panel was then aged until the finish was thoroughly dry and a hard, adherable film formed. This aging period usually covered six weeks under ordinary conditions of exposure at room temperature. The coated panels were then used to test the film removing characteristics of an aromatic nitrile. The panels were placed flat and a nitrile was spread on the surface of the film. Particular care was taken to prevent the nitrile from running over the edge of the panel, thus eliminating the possibility of its getting under the film. After a five-minute period of contact, the panel was wiped with a clean cloth. The protective coating was found to be easily removed at the spot where the nitrile had been applied, as the following illustrative results will show:

| Example | Panel | Protective Coating | Nitrile | Results |
|---|---|---|---|---|
| 1 | Iron | Chemical Resistant Paint | Benzonitrile | Coating cleanly removed. |
| 2 | do | Red Lead Oxide Metal Primer | do | Do. |
| 3 | Wood | Oil Stain | do | Do. |
| 4 | do | Stain and varnish | do | Do. |
| 5 | Iron | Galvanized Iron Primer | do | Do. |
| 6 | do | Aluminum Paint | do | Do. |
| 7 | do | Terra Cotta Floor and Deck Enamel | do | Do. |
| 8 | Wood | do | do | Do. |
| 9 | do | Oil Stain and Shellac | do | Do. |
| 10 | do | Wall Flat | do | Do. |

Other organic nitriles, such as acetonitrile, were likewise tested on the above described panels and proved to be effective film removers. However, benzonitrile was found to remove all of the above mentioned protective coatings more quickly and thoroughly than the other nitriles and accordingly the use of this compound, either alone or in combination with other materials as heretofore described, represents a preferred embodiment of the present invention.

We claim:

1. In a process for removing a protective coating film from a surface coated therewith wherein said film is softened by the application thereto of a liquid composition and wherein the softened film is removed from said surface, the improvement which comprises applying to said film a liquid consisting of an aromatic nitrile.

2. In a process for removing a protective coating film from a surface coated therewith wherein said film is softened by the application thereto of a liquid composition and wherein the softened film is removed from said surface, the improvement which comprises applying to said film a liquid consisting of benzonitrile.

3. In a process for removing a protective coating film from a surface coated therewith wherein said film is softened by the application thereto of a liquid composition and wherein the softened film is removed from said surface, the improvement which comprises applying to said film a liquid consisting of a tolunitrile.

RICHARD B. BISHOP.
WILLIAM I. DENTON.

REFERENCES CITED

The following references are of record in the file of this patent:

UNITED STATES PATENTS

| Number | Name | Date |
|---|---|---|
| 1,553,485 | Tennis | Sept. 15, 1925 |
| 1,759,840 | Cole et al. | May 27, 1930 |